(12) United States Patent
Guehring

(10) Patent No.: US 9,799,233 B2
(45) Date of Patent: Oct. 24, 2017

(54) APPARATUS AND METHOD FOR OPERATING A FLIGHT SIMULATOR WITH A SPECIAL IMPRESSION OF REALITY

(75) Inventor: Olaf Guehring, Eurasburg (DE)

(73) Assignee: GRENZEBACH MASCHINENBAU GMBH, Asbach-Baeumenheim (DE)

(*) Notice: Subject to any disclaimer, the term of this patent is extended or adjusted under 35 U.S.C. 154(b) by 20 days.

(21) Appl. No.: 13/818,638

(22) PCT Filed: Aug. 22, 2011

(86) PCT No.: PCT/DE2011/001641
§ 371 (c)(1),
(2), (4) Date: May 6, 2013

(87) PCT Pub. No.: WO2012/041268
PCT Pub. Date: Apr. 5, 2012

(65) Prior Publication Data
US 2013/0209967 A1    Aug. 15, 2013

(30) Foreign Application Priority Data
Aug. 30, 2010  (DE) .......................... 10 2010 035 814

(51) Int. Cl.
G09B 9/02       (2006.01)
G09B 19/16      (2006.01)
(Continued)

(52) U.S. Cl.
CPC ............. *G09B 19/165* (2013.01); *G09B 9/04* (2013.01); *G09B 9/052* (2013.01); *G09B 9/08* (2013.01);
(Continued)

(58) Field of Classification Search
CPC .. A63B 22/0605; A63B 71/0622; G09B 9/08; G09B 9/02; G09B 9/04; G09B 9/05;
(Continued)

(56) References Cited

U.S. PATENT DOCUMENTS 5,137,348 A *  8/1992  Lacroix ........................... 353/79
5,333,514 A    8/1994  Toyama et al.
(Continued)

FOREIGN PATENT DOCUMENTS

CN          1156807 C       7/2004
CN         101632110 A      1/2010
(Continued)

OTHER PUBLICATIONS

Jürgen Warmbold, "Simply Cool—Robots conquer Legoland", Jul. 21, 2003, http://www.kuka-robotics.com/en/pressevents/productnews/NP_030721_Legoland.htm, pp. 1-3.*
(Continued)

*Primary Examiner* — Jack Yip
(74) *Attorney, Agent, or Firm* — Brinks Gilson & Lione

(57) ABSTRACT

An apparatus for operating a simulator with a special impression of reality is provided. The apparatus is configured for learning how to control a vehicle moving in three-dimensional reality. Controllable systems for detecting human stress reactions are provided. The controllable systems may be configured for sensing the resistance of the skin and for detecting movements of persons and physiognomy.

11 Claims, 3 Drawing Sheets

(51) Int. Cl.
*G09B 9/04* (2006.01)
*G09B 9/052* (2006.01)
*G09B 9/08* (2006.01)
*G09B 9/12* (2006.01)
*G09B 9/16* (2006.01)
*G09B 9/30* (2006.01)
*G09B 9/46* (2006.01)
*A63B 22/06* (2006.01)
*A63B 71/06* (2006.01)
*G09B 9/00* (2006.01)

(52) U.S. Cl.
CPC .............. *G09B 9/12* (2013.01); *G09B 9/16* (2013.01); *G09B 9/30* (2013.01); *G09B 9/46* (2013.01); *A63B 22/0605* (2013.01); *A63B 71/0622* (2013.01); *G09B 9/00* (2013.01)

(58) Field of Classification Search
CPC ........ G09B 9/32; G09B 19/16; G09B 19/165; G09B 9/00; G09B 9/12
USPC ................. 434/29, 219, 35, 55, 69; 482/57
See application file for complete search history.

(56) References Cited

U.S. PATENT DOCUMENTS

| | | | |
|---|---|---|---|
| 5,685,718 | A | 11/1997 | McClintic |
| 5,715,729 | A | 2/1998 | Toyama et al. |
| 6,516,681 | B1 | 2/2003 | Pierrot et al. |
| 2001/0041326 | A1 | 11/2001 | Zeier |
| 2002/0183123 | A1 | 12/2002 | De-Gol |
| 2005/0028092 | A1 | 2/2005 | Carro |
| 2005/0042578 | A1 | 2/2005 | Ammon et al. |
| 2006/0208961 | A1 | 9/2006 | Nathan et al. |
| 2008/0206720 | A1* | 8/2008 | Nelson ............... 434/44 |
| 2010/0014009 | A1* | 1/2010 | Stavaeus et al. ....... 348/837 |
| 2010/0216097 | A1 | 8/2010 | Romagnoli et al. |
| 2011/0039235 | A1 | 2/2011 | Margreiter |
| 2011/0076648 | A1* | 3/2011 | Lindheim et al. ....... 434/38 |
| 2011/0122344 | A1 | 5/2011 | Matsumuro et al. |
| 2011/0260830 | A1* | 10/2011 | Weising ............... 340/5.52 |
| 2011/0282130 | A1* | 11/2011 | Krueger ............... A61M 21/00 600/27 |
| 2013/0135176 | A1* | 5/2013 | Jang ................. 345/1.2 |

FOREIGN PATENT DOCUMENTS

| | | |
|---|---|---|
| CN | 201540661 U | 8/2010 |
| DE | 101 50 382 A1 | 4/2003 |
| DE | 696 28 410 T2 | 3/2004 |
| DE | 600 20 466 T2 | 4/2006 |
| DE | 10 2006 016 716 A1 | 10/2007 |
| DE | 10 2008 023 955 B4 | 11/2009 |
| DE | 10 2008 023 9455 B5 | 11/2009 |
| EP | 0997175 A1 | 5/2000 |
| FR | 2 677 155 A1 | 12/1992 |
| JP | 05-011685 | 7/1991 |
| JP | 05-158399 | 12/1991 |
| JP | 06-218148 | 8/1994 |
| JP | 09-319291 | 5/1996 |
| JP | 08-248872 | 9/1996 |
| JP | 10-085450 | 9/1996 |
| JP | 11-276715 | 10/1999 |
| JP | 2000037239 | 2/2000 |
| JP | 2000-194252 | 7/2000 |
| JP | 2000-293095 | 10/2000 |
| JP | 34-007186 | 5/2003 |
| JP | 2004-503308 | 2/2004 |
| JP | 2005-509948 | 4/2004 |
| JP | 3836878 B2 | 10/2006 |
| JP | 2008-530599 | 8/2008 |
| JP | 2008-224885 | 9/2008 |
| JP | 2010-032642 | 2/2010 |
| JP | 2010-134171 | 6/2010 |
| WO | WO 96/26 512 | 8/1996 |
| WO | WO 2005/119625 A1 | 12/2005 |
| WO | WO 2009/089561 A2 | 7/2009 |

OTHER PUBLICATIONS

Japanese Office Action for Application No. 2013-525138, Dated Apr. 1, 2014 and English Translation.
Chinese Office Action for Application No. 201180041924.0, Dated Oct. 10, 2014 and English Translation.
Korean Office Action for Application No. 10-2013-7005594, Dated Nov. 20, 2014 and English Translation.
Anonymus, "Linear units for horizontal robot traverse" Internet Citation, May 15, 2008, URL:http://www.robotics.org/product-catalog-detail.cfm/KUKA-Robotics-Corporation/Linear-units-for-horizontal-robot-traverse/productid/1768.
Anonymus, "Heli Trainer sets new standards in pilot training" Internet Citation, Dated May 19, 2010, URL:http://www.kuka-robotics.com/usa/en/pressevents/news/print/NN__100519__Heli-Trainer.htm.
German Office Action, Serial No. 10 2010 035 814.2-55, Dated Apr. 1, 2011 and English Translation.
International Search Report for International Serial No. PCT/DE2011/001641, Dated Mar. 26, 2013.

* cited by examiner

APPARATUS AND METHOD FOR OPERATING A FLIGHT SIMULATOR WITH A SPECIAL IMPRESSION OF REALITY

CROSS REFERENCE TO RELATED APPLICATIONS

This application is a national stage application under 35 U.S.C. 371 of international application number PCT/DE2011/001641 filed Aug. 30, 2011 (WO 2012/041268 A9) and also claims priority to German application number 10 2010 035 814.2 filed Aug. 30, 2010, all of which are hereby incorporated by reference in their entirety.

SUMMARY

The invention relates to a method and an apparatus for operating a flight simulator with a special impression of reality.

DE 10 2008 023 955 B4 describes a method for simulating events and processes of aircraft, land vehicles or watercraft and a simulation system. This invention is based on the object of actuating a simulation device in real time even though the data which is necessary for actuation is made available merely by a non-real-time simulation program, wherein a latency time which is caused by a data manager is to be compensated.

In this context, the time which is actually required by processes in the real world is understood to be the real time. The term real time does not mean a specific speed or processing power of the program or of the controller but instead defines only the time frame within which the system must react. The term latency time means a time period between an action and the occurrence of the expected reaction, that is to say a delay time. In this patent, protection is essentially given to the fact that if data is not received in good time the data gap which occurs is replaced by data from empirical values or data from preceding simulation programs and this data is then transmitted to the movement controller of the real time simulation device [0046]. Details on the specific improvement of the mechanical configuration of a flight simulator are not available here.

DE 600 20 466 T2 describes what is referred to as a parallel robot with four degrees of freedom which solves the problem of shifting a movable plate with four degrees of freedom at high speed and with a high acceleration and of positioning the moveable plate with a high degree of rigidity and accuracy. The term parallel robot is used here to refer to a robot in which a multiplicity of actuators are arranged in parallel, wherein such a robot can be applied, for example, in a travel simulator for a motor vehicle. With respect to the prior art, this document specifies parallel robots which have six degrees of freedom and which are used, for example, in flight simulators such as are disclosed in U.S. Pat. No. 5,333,514 and U.S. Pat. No. 5,715,729. In order to solve the problem proposed in DE 600 20 466 T2, a parallel robot is described which is composed essentially of a specific arrangement of a parallel linkage (3), a moving platform (4), coupling parts (42) and kinematic elements (33). A particular application of such a robot in a flight simulator is not mentioned here.

WO 96/26 512 A (translation of the corresponding European patent available as DE 696 23 410 T2) discloses an improved flight simulator which is based on the problem of more precisely simulating the real movement which a pilot senses when maneuvering an aircraft. This is based on a movement simulator having a supporting device (102) and a pitching movement strut (114) with a pitching movement axis, wherein the pitching movement strut (114) is rotatably connected to the support device, and wherein the movement simulator comprises the following:

a rolling movement strut (134) with a rolling movement axis which is perpendicular to the pitching movement axis and is rotatably connected to the pitching movement strut (114), and a participant cabin (160) having a center of gravity, wherein the participant cabin (160) is held by the rolling movement strut in such a way that the center of gravity of the participant cabin is separated from the pitching movement axis.

In order to solve the above problem, in the case of this flight simulator protection was given to the fact that the rolling movement strut (134) is rotatably connected to the pitching movement strut (114) in such a way that the rolling movement strut (134) can rotate completely about the pitching movement strut (114) in a plane perpendicular to the pitching movement axis. Apart from the fact that this feature only contains details which relate to an effect to be achieved, without details on the specific embodiment, the flight simulator described here appears worthy of improvement.

The apparatus according to the invention and the corresponding method are therefore based on the object of presenting an apparatus and a method with which the operation of a simulator can be achieved with a special impression of reality for learning how to control a vehicle, in particular an aircraft, moving in three-dimensional reality. In addition, for the instructor who is accompanying the learning process there is also to be the possibility of being able to monitor objectively the learning progress and the degree of loading of a trainee.

This object is achieved with an apparatus as claimed in claim 1 and a method as claimed in claim 6.

The apparatus according to the invention will be described in more detail below. In particular, in this context, in the drawing:

DETAILED DESCRIPTION

The underlying idea of the present invention is, on the one hand, to simulate, by means of a special 6-axis robot which can be moved in two dimensions, the conditions in a vehicle cabin, specifically of an aircraft, such as actually occur in reality. On the other hand, the trainee is to be provided with a real simulation of the expected difficulties by means of a realistic representation of the surroundings which are to be expected during operation. The instructor is, in turn, to be supplied all the time with a realistic impression of the physical and psychic loading and/or the load-bearing capability of a trainee by means of data representing the physical state of the trainee.

Figure 1:
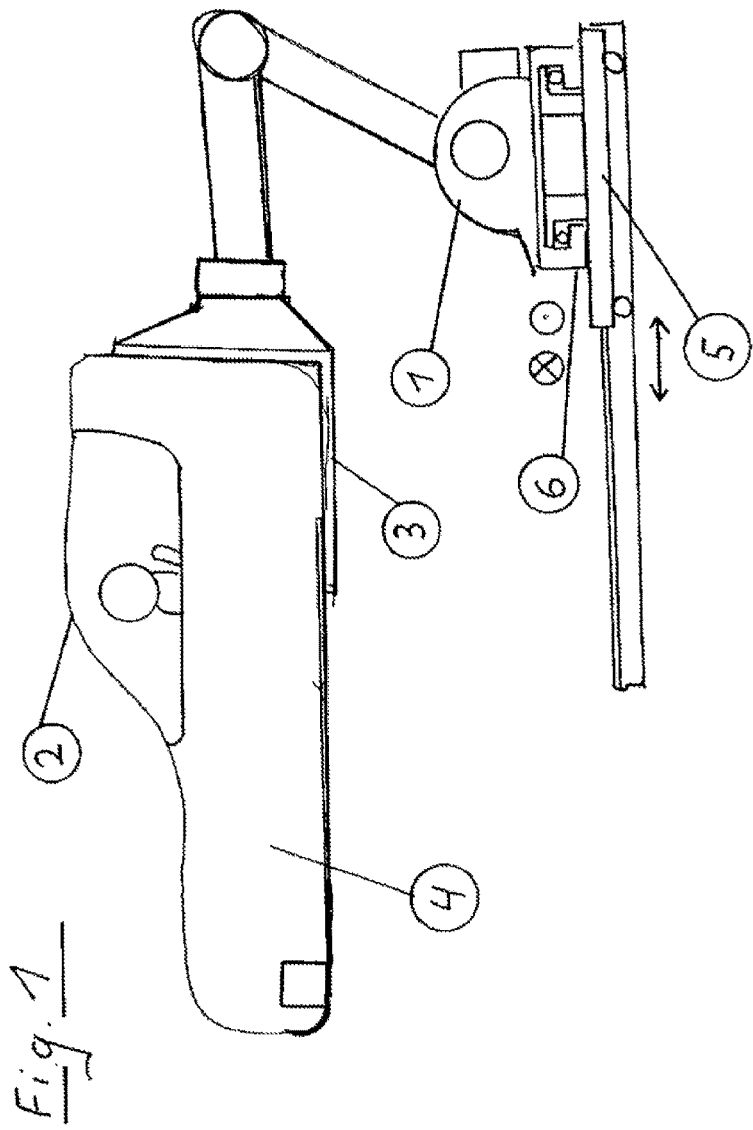
FIG. 1 shows a side view of a simulator according to the invention.

The side view of a simulator according to the invention shown in FIG. 1 makes the main novelties of the inventive concept apparent. A 6-axis robot 1 is, on the one hand, connected here directly via an adaptor plate 3 to a vehicle cockpit 4, to the entry 2 and, on the other hand, securely to a device 6 for translatory lateral movement. The lateral movements which are possible with this device 6 are characterized by means of the customary arrow symbols. The travel movements of a device 5 for translatory longitudinal movement, on which device 5 the device 6 is installed, are illustrated by means of the double arrow shown. This combination of the devices 6 and 5 permits accelerated movements of the aircraft cabin 4 in the longitudinal direction and in the lateral direction simultaneously, independently of the movements of the robot 1. The longitudinal direction is defined here by the longitudinal orientation of the aircraft, that is to say of the aircraft cabin 4. Since the simulation of the conditions in an aircraft such as, for example, a passenger plane, is expected to involve the greatest demands being made of the simulator, this case will be considered in more detail below.

The center of gravity of a passenger plane, or of any other aircraft with aerofoils, is approximately in the region of the center of these aerofoils. The center of gravity is the point at which the entire weight of such an aircraft can be imagined as being combined and about which the entire plane can, as it were, rotate. However, the pilot's seat is generally located at a distance from the center of gravity of the plane, both shifted forward in the direction of flight and moved upward in relation to the center of gravity of the plane. This means that, for example when a plane starts, the pilot not only experiences the normal movement of the center of gravity of his plane but also experiences an additional torque which arises substantially from the distance between the pilot's seat and the center of gravity of the plane.

In the example of FIG. 1, this corresponds approximately to the distance between the center of the device 5 for a translatory longitudinal movement and the seat 4 in the aircraft cockpit of the flight simulator. Therefore, in order to simulate a starting process it is possible with the simulator according to the invention to move the vehicle cockpit 4 in the longitudinal direction by means of the device 5 for translatory longitudinal movement. The 6-axis robot 1 carries out the normal combined lifting movement and pivoting movement of a starting vehicle here. For this purposes, the device 5 can be moved with natural acceleration in the translatory mode. As a result of the fact that the device 6 for translatory lateral movement is movably installed on the device 5 for translatory longitudinal movement, combined accelerated movements of the two devices are possible both individually and jointly.

In order to use the device 6 for translatory lateral movement, reference is made to the following example:

If in this case of a normal starting process it is also to be stimulated that during the starting process the aircraft is affected by shearing winds, a hazardous form of side winds, this can be simulated in conditions close to reality by means of the additional use of the device 6 for translatory lateral movement. In this context it is self-evident that such a simulation by means of the devices 5 and 6 for translatory longitudinal movement and respectively for translatory lateral movement can only take place for as long as the travel path of the respective device is configured. However, in practice the travel path of the device 5 for translatory longitudinal movement is made longer than that of the device 6 for translatory lateral movement. This also corresponds to the real requirements here since shearing winds usually occur briefly and in the manner of gusts.

In particular the unexpected occurrence of shearing winds when aircraft start or land easily gives rise to accidents and it is to be simulated by means of the inventive simulator in conditions close to reality.

Figure 2:
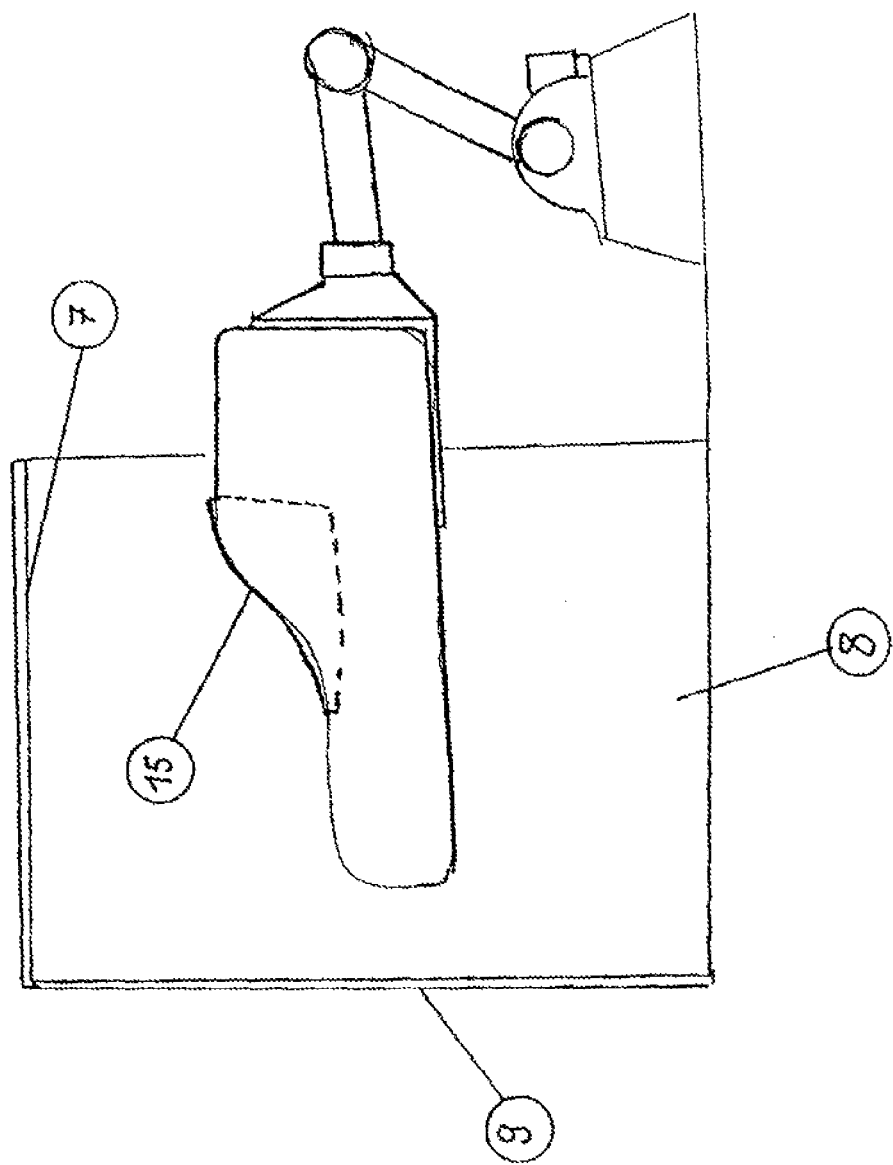
FIG. 2 shows a side view of the projection conditions.

FIG. 2 outlines in a side view the projection conditions of the simulated external view in the vehicle cockpit 4.

The reference 15 represents here a possible OLED view which can be adapted, as a flexible screen, to the contours of the respective vehicle cockpit 4. OLED stands here for "organic light emitting diode" and denotes a low-viscosity illuminating component made of organic semi-conducting materials which differs from the inorganic light-emitting diodes in that, on the one hand, the power density and the lighting density are lower and, on the other hand, no monocrystalline materials are necessary. The OLED technology is excellently well suited for screens and displays. A further field of use is large-area spatial illumination.

An alternative possible way of representing the simulated external view is that this external view is projected by means of projectors onto projection surfaces which are located outside the vehicle cockpit 4.

See in this respect:

http://en.wikipedia.org/wiki/Cave_Automatic_Virtual_Environment. In the side view shown, the projection surface 9 of the front portion, the projection surface 8 of the right-hand side portion and the projection surface 7 of the ceiling portion can be seen in this case. These projection surfaces can be connected to the vehicle cabin 4 or installed in the simulation space. In the latter case, these projection surfaces must, of course, be correspondingly large in the spatial dimensions. There are suitable projection methods for this purpose which permit a scene to be represented with a depth character on straight, abutting projection surfaces with joint edges which run in a linear fashion, wherein these joint edges which run in a linear fashion can be made invisible for representing a total image with relatively low computational complexity. This making invisible is carried out by means of "calculating out" by computer the relatively precisely defined abutment edges of the projection areas used.

For the use of the flight simulator according to the invention for training helicopter pilots, it is also possible in one particular refinement to provide a further projection surface which maps the ground area. In this case, the aircraft cockpit 4 is equipped with an additional transparent floor panel.

Figure 3:
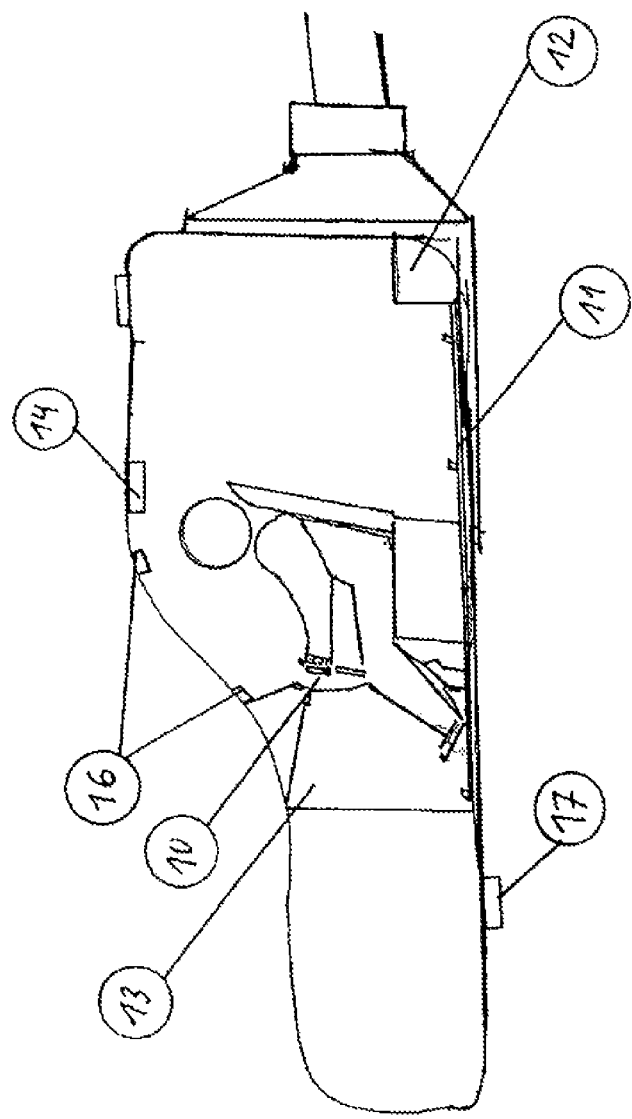
FIG. 3 shows a representation of the implemented additional simulation devices and systems for detecting the human reactions.

FIG. 3 shows a representation of the implemented additional simulation devices and systems for detecting the human reactions. For this purpose of simulating a fire which has broken out onboard, a central smoke generator 12 is provided with a controllable smoke distribution 11. With this system it is possible for the operator of the simulation system to produce smoke of a defined type and intensity at certain locations of the aircraft cockpit 4 which are important for practical use. In addition, in a particular form of the embodiment it is possible to subject the entire vehicle cockpit 4, in a defined way which occurs under practical everyday conditions, to shaking movements such as are caused, for example, by propulsion unit damage which is becoming apparent. In order to be able to simulate the occurrence of such damage situations in even more realistic fashion, in this embodiment additional acoustic backgrounds are also provided to the flight trainee by means of a complex loudspeaker system. For reasons of clarity, corresponding devices have not been represented separately. The system 14 for illuminating the cabin can be changed in a directly controlled manner or in a programmed manner with respect to the color and the intensity (flickering light) in accordance with the simulated realities.

The reactions of a flight trainee can be detected with the detector device 16 for detecting a movement of persons and/or for detecting the physiognomy and/or recorded for later evaluation of the human reactions (maneuver criticism).

The measuring device 10 for measuring the resistance of the skin of a flight trainee serves a comparable purpose. The resistance of the skin can be most easily measured in the region of the control knob or some other control unit. The surface of an emergency switch, which is possibly present, is also suitable for this purpose.

The sensor 17 serves to detect the actually realised movements of the vehicle cockpit 4. The output signals of the sensor 17 serve to record the entire profile of a training unit of the respectively operated simulation program.

The operator control panel used can be quickly adapted to the respectively simulated aircraft type or vehicle type by means of the module system 13 using easy-to-exchange slide-units.

It is apparent that the flight simulator according to the invention is also suitable for use in military projects since a considerable experience potential of a fighter pilot is important particularly in this area for the purposes of preparing for hazardous deployment. Such experience potential can be obtained cost-effectively by training with a flight simulator with a special impression of reality without endangering human lives.

The control of the complex movement processes and the signal processing of the sensors used requires a special control program.

As a person skilled in the art will readily appreciate, the above description is meant as an illustration of implementation of the principles this application. This description is not intended to limit the scope of this application in that the invention is susceptible to modification, variation and change, without departing from the spirit of this application, as defined in the following claims.

LIST OF REFERENCE NUMBERS 1 6-Axis robot
2 Entry
3 Adaptor plate
4 Vehicle cockpit, aircraft cockpit
5 Device for translatory longitudinal movement
6 Device for translatory lateral movement
7 Projection surface of the ceiling portion
8 Projection surface of the right-hand side portion
9 Projection surface of the front portion
10 Measuring device for measuring the resistance of the skin
11 Smoke distribution
12 Smoke producer
13 Module system for changing over the operator control panel
14 System for illuminating the cabin
15 OLED display
16 Detector device for detecting movement of persons and/or for detecting the physiognomy
17 Sensor for detecting the cockpit movement

The invention claimed is:

1. An apparatus for operating a simulator with a special impression of reality for learning how to control a vehicle, in particular an aircraft, moving in three-dimensional reality, the apparatus comprising:
   a) a vehicle cab modeled on the vehicle to be simulated and having real operator control elements, the vehicle cab being connected to a 6-axis industrial robot and to ground via a device for translatory lateral movement which is movably mounted at a right angle on a device for translatory longitudinal movement,
   b) a display modeled on contours of the vehicle cab serves to transmit a simulated external view, wherein the display is a flexible organic light-emitting diode (OLED) screen,
   c) for the purposes of simulating hazardous situations which occur in practice, controllable systems for artificially producing smoke, shaking movements, sound generation and light phenomena are provided,
   d) for detecting human stress reactions, controllable systems for sensing resistance of skin and for detecting movements of persons and physiognomy in response to artificially producing smoke, shaking movements, sound generation and light phenomena,
   e) a sensor for detecting the actual movements of the vehicle cab, wherein the output signals of the sensor serve to record an entire profile of a training unit,
   f) a system for externally operating and controlling the simulator, which system also registers the reactions of a flight trainer.

2. The apparatus for operating a simulator as claimed in claim 1, wherein in order to transmit a simulated external view, a display is used which is projected by projectors onto projection surfaces which are located outside the vehicle cab.

3. The apparatus as claimed in claim 1, wherein an operator control panel of the vehicle cab is quickly adapted to a respectively simulated aircraft type, in an easily exchangeable fashion, by a module system.

4. The apparatus as claimed in claim 1, wherein for the purpose of training, in particular helicopter pilots, a further projection surface which maps a ground area is also provided, and in that the vehicle cab is equipped with a transparent floor panel.

5. The apparatus as claimed in claim 1, wherein, for the purpose of training in a military field for simulating hazardous situations which occur in practice, parameters which are relevant in terms of military technology, of an acoustic, optical and mechanical nature, are provided.

6. The apparatus for operating a simulator as claimed in claim 1, wherein the controllable systems for sensing the resistance of the skin are integrated into a control knob.

7. A method for operating a simulator with a special impression of reality for learning how to control a vehicle, in particular an aircraft, moving in three-dimensional reality, the method comprising:
   a) providing a vehicle cab modeled on the vehicle to be simulated and having real operator control elements can be moved by means of an external operator control unit by means of a 6-axis industrial robot which can be moved in two orthogonal directions on ground,
   b) conveying a simulated external view to the simulator via a flexible organic light-emitting diode (OLED) screen,
   c) providing, for the purposes of simulating hazardous situations which occur in practice, controllable systems for artificially producing smoke, shaking movements, sound generation and light phenomena,
   d) providing, for detecting human stress reactions, controllable systems for sensing resistance of skin and detecting movements of persons and physiognomy in response to producing smoke, shaking movements, sound generation and light phenomena,
   e) measuring, using a sensor, position of the vehicle cab,
   f) recording output signals from the sensor of an entire profile of a training unit, and g) an operator control panel used can be quickly adapted to a respectively simulated aircraft type by means of a module system.

8. The method as claimed in claim 7, wherein in order to convey a simulated external view, a display is used which is projected by means of projectors onto projection surfaces which are located outside the vehicle cab.

9. A computer program having a program code for implementing the method steps as claimed in claim 7, wherein the program is running in a computer.

10. A machine-readable carrier having the program code of a computer program for implementing the method as claimed in claim 7, wherein the program is running in a computer.

11. The method as claimed in claim 7, wherein the controllable systems for sensing the resistance of the skin are integrated into a control knob.

\* \* \* \* \*